US012783523B1

(12) United States Patent
Wu et al.

(10) Patent No.: US 12,783,523 B1
(45) Date of Patent: Nov. 3, 2026

(54) EFFICIENT EXECUTION OF DATABASE QUERIES

(71) Applicant: Notion Labs, Inc., San Francisco, CA (US)

(72) Inventors: Chenyang Wu, San Mateo, CA (US); Jacob Ian Teton-Landis, Miami, FL (US); Jeremiah Fong, Walnut Creek, CA (US); Aziz Michael Batihk, San Francisco, CA (US); Benjamin Schley Hughes, Brooklyn, NY (US)

(73) Assignee: Notion Labs, Inc., San Francisco, CA (US)

( * ) Notice: Subject to any disclaimer, the term of this patent is extended or adjusted under 35 U.S.C. 154(b) by 0 days.

(21) Appl. No.: 19/232,037

(22) Filed: Jun. 9, 2025

Related U.S. Application Data

(60) Provisional application No. 63/806,422, filed on May 15, 2025.

(51) Int. Cl.

| | |
|---|---|
| ***G06F 16/10*** | (2019.01) |
| ***G06F 16/16*** | (2019.01) |
| ***G06F 16/20*** | (2019.01) |
| ***G06F 16/2455*** | (2019.01) |

(52) U.S. Cl.
CPC ...... *G06F 16/24553* (2019.01); *G06F 16/164* (2019.01)

(58) Field of Classification Search
CPC .......................... G06F 16/24553; G06F 16/164
See application file for complete search history.

(56) References Cited

U.S. PATENT DOCUMENTS

| | | | | |
|---|---|---|---|---|
| 11,580,068 | B2 * | 2/2023 | Dwyer | G06F 16/951 |
| 12,118,513 | B1 * | 10/2024 | Lu | G06F 9/451 |
| 12,360,973 | B1 * | 7/2025 | Leibundguth | G06F 16/71 |

* cited by examiner

*Primary Examiner* — Kristopher Andersen
(74) *Attorney, Agent, or Firm* — Ashurst Perkins Coie US LLP; Alberto Araiza; Lena Petrovic

(57) ABSTRACT

Systems, methods, and computer-readable media for efficiently processing database queries are disclosed herein. A first database query is received from a user to retrieve data from a dynamic, user-defined database in a workspace. A second database is generated within a structured data management file associated with the workspace, based on the first database. A modification to the first database is received. An indexed representation of the second database is generated, including the modification. The second database is updated based on the modification. A set of operations included in the first database query is executed on the second database. A response to the first database query is displayed based on the output of the execution.

19 Claims, 7 Drawing Sheets

EFFICIENT EXECUTION OF DATABASE QUERIES

CROSS-REFERENCE TO RELATED APPLICATIONS

This application claims priority to and the benefit of U.S. Provisional Application No. 63/806,422, titled "EFFICIENT EXECUTION OF DATABASE QUERIES" filed on May 15, 2025. The content of the aforementioned application is herein incorporated by reference in its entirety.

BACKGROUND

A database system is a collection of software and hardware components designed to efficiently store, manage, retrieve, and manipulate data. Database systems provide a systematic and organized way to handle large amounts of information, promoting data integrity, security, and accessibility. A database management system (DBMS) is software included in a database system that interacts with end users, applications, and the database itself to capture and analyze data.

A specific model of database is a relational database. A relational database organizes data into one or more tables (or "relations") of columns and rows, with a unique key identifying each row. Rows are also called records or tuples while columns are also called attributes. Indices can be created on any combination of attributes on a relation. Queries that filter using those attributes can find matching tuples directly using the index (similar to Hash table lookup), without having to check each tuple in turn.

BRIEF DESCRIPTION OF THE DRAWINGS

Reference will now be made, by way of example, to the accompanying drawings which show example embodiments of the present application, and in which.

Figure 1:
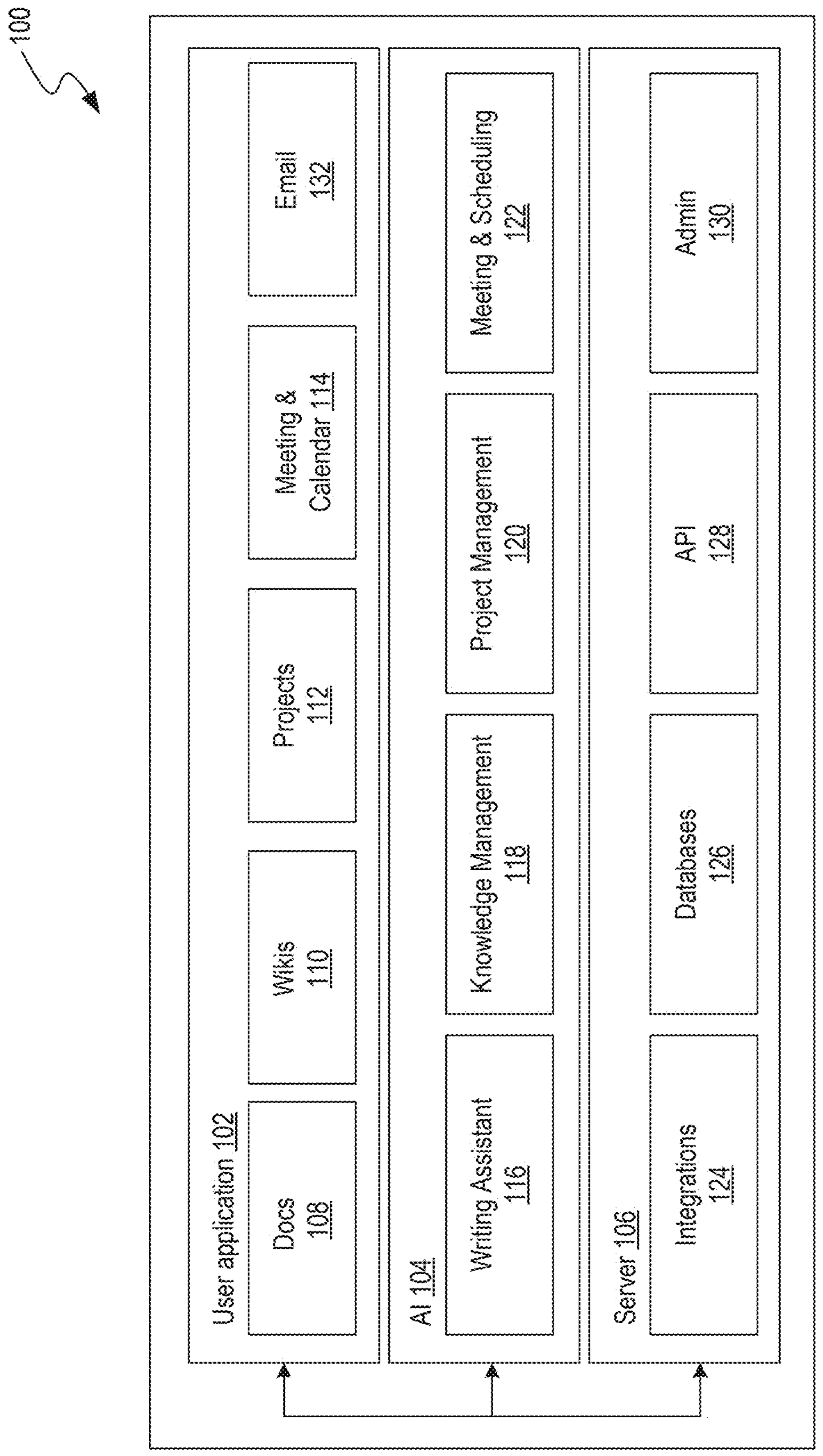
FIG. 1 is a block diagram illustrating a platform, which may be used to implement examples of the present disclosure.

The technologies described herein will become more apparent to those skilled in the art by studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

As organizations accumulate increasing volumes of data, there is a growing need for database systems that can efficiently handle complex queries on large datasets. Traditional relational database management systems often struggle to provide adequate performance for certain types of queries, especially those involving user-defined schemas or frequently changing data structures. Some existing technologies allow users to create custom database schemas tailored to their specific needs. This flexibility is valuable for users but can present challenges for database query optimization. When schemas are defined dynamically by users rather than predetermined by developers, databases cannot be indexed ahead of receiving a query. As a result, queries against user-defined schemas may execute slowly, particularly as the volume of data grows.

Another challenge faced by database systems is keeping query performance consistent as data is frequently modified. Applications that allow users to frequently add, remove, or change database fields and structures can lead to fragmentation, missed updates/modifications to databases, and degraded query performance over time. Maintaining fast query speeds while supporting a high rate of schema changes is an ongoing area of research in database system design.

As users increasingly expect real-time responsiveness from applications and customizability of data objects, there is pressure on database systems to execute complex analytical queries on dynamically changing databases with minimal latency. This is especially challenging for queries that involve filtering or sorting across user-defined properties. Balancing query performance, flexibility, and data consistency remains an active area of development for database technologies.

The present technology provides for systems, methods, and computer-readable media for efficiently executing database queries. The present technology aims to enhance the efficiency of querying dynamic, user-defined databases while maintaining data consistency and high query performance. By dynamically materializing and updating indexed and structured databases that are configured for efficient querying and are based on dynamic and user-defined databases, efficient querying of large datasets with complex, customized filters and sorts is enabled. Further, the present technology aims to maintain consistency between the structured databases and the corresponding user-defined databases by providing efficient mechanisms for receiving modifications to user-defined databases and for catching up on missed updates during system deployments or downtime. The overall goal is to meet the pressing demand for database systems that can handle dynamic, user-defined schemas while delivering superior query performance and data consistency.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Block Data Model

The disclosed technology includes a block data model ("block model"). The blocks are dynamic units of information that can be transformed into other block types and move across workspaces. The block model allows users to customize how their information is moved, organized, and shared. Hence, blocks contain information but are not siloed.

Blocks are singular pieces that represent all units of information inside an editor. In one example, text, images, lists, a row in a database, etc., are all blocks in a workspace. The attributes of a block determine how that information is rendered and organized. Every block can have attributes including an identifier (ID), properties, and type. Each block is uniquely identifiable by its ID. The properties can include a data structure containing custom attributes about a specific block. An example of a property is "title," which stores text content of block types such as paragraphs, lists, and the title of a page. More elaborate block types require additional or different properties, such as a page block in a database with user-defined properties. Every block can have a type, which defines how a block is displayed and how the block's properties are interpreted.

A block has attributes that define its relationship with other blocks. For example, the attribute "content" is an array (or ordered set) of block IDs representing the content inside a block, such as nested bullet items in a bulleted list or the text inside a toggle. The attribute "parent" is the block ID of a block's parent, which can be used for permissions. Blocks can be combined with other blocks to track progress and hold all project information in one place.

A block type is what specifies how the block is rendered in a user interface (UI), and the block's properties and content are interpreted differently depending on that type. Changing the type of a block does not change the block's properties or content—it only changes the type of attribute. The information is thus rendered differently or even ignored if the property is not used by that block type. Decoupling property storage from block type allows for efficient transformation and changes to rendering logic and is useful for collaboration.

Blocks can be nested inside of other blocks (e.g., infinitely nested subpages inside of pages). The content attribute of a block stores the array of block IDs (or pointers) referencing those nested blocks. Each block defines the position and order in which its content blocks are rendered. This hierarchical relationship between blocks and their render children are referred to herein as a "render tree." In one example, page blocks display their content in a new page, instead of rendering it indented in the current page. To see this content, a user would need to click into the new page.

In the block model, indentation is structural (e.g., reflects the structure of the render tree). In other words, when a user indents something, the user is manipulating relationships between blocks and their content, not just adding a style. For example, pressing Indent in a content block can add that block to the content of the nearest sibling block in the content tree.

Blocks can inherit permissions of blocks in which they are located (which are above them in the tree). Consider a page: to read its contents, a user must be able to read the blocks within that page. However, there are two reasons one cannot use the content array to build the permissions system. First, blocks are allowed to be referenced by multiple content arrays to simplify collaboration and a concurrency model. But because a block can be referenced in multiple places, it is ambiguous which block it would inherit permissions from. The second reason is mechanical. To implement permission checks for a block, one needs to look up the tree, getting that block's ancestors all the way up to the root of the tree (which is the workspace). Trying to find this ancestor path by searching through all blocks' content arrays is inefficient, especially on the client. Instead, the model uses an "upward pointer"—the parent attribute—for the permission system. The upward parent pointers and the downward content pointers mirror each other.

A block's life starts on the client. When a user takes an action in the interface—typing in the editor, dragging blocks around a page—these changes are expressed as operations that create or update a single record. The "records" refer to persisted data, such as blocks, users, workspaces, etc. Because many actions usually change more than one record, operations are batched into transactions that are committed (or rejected) by the server as a group.

Creating and updating blocks can be performed by, for example, pressing Enter on a keyboard. First, the client defines all the initial attributes of the block, generating a new unique ID, setting the appropriate block type (to_do), and filling in the block's properties (an empty title, and checked: [["No"]]). The client builds operations to represent the creation of a new block with those attributes. New blocks are not created in isolation: blocks are also added to their parent's content array, so they are in the correct position in the content tree. As such, the client also generates an operation to do so. All these individual change operations are grouped into a transaction. Then, the client applies the operations in the transaction to its local state. New block objects are created in memory and existing blocks are modified. In native apps, the model caches all records that are accessed locally in an LRU (least recently used) cache on top of SQLite or IndexedDB, referred to as RecordCache. When records are changed on a native app, the model also updates the local copies in RecordCache. The editor re-renders to draw the newly created block onto the display. At the same time, the transaction is saved into TransactionQueue, the part of the client responsible for sending all transactions to the model's servers so that the data is persisted and shared with collaborators. TransactionQueue stores transactions safely in IndexedDB or SQLite (depending on the platform) until they are persisted by the server or rejected.

A block can be saved on a server to be shared with others. Usually, TransactionQueue sits empty, so the transaction to create the block is sent to the server in an application programming interface (API) request. In one example, the transaction data is serialized to JSON and posted to the /saveTransactions API endpoint. Save Transactions gets the data into source-of-truth databases, which store all block data as well as other kinds of persisted records. Once the request reaches the API server, all the blocks and parents involved in the transaction are loaded. This gives a "before" picture in memory. The block model duplicates the "before" data that had just been loaded in memory. Next, the block model applies the operations in the transaction to the new copy to create the "after" data. Then the model uses both "before" and "after" data to validate the changes for permissions and data coherency. If everything checks out, all created or changed records are committed to the database—meaning the block has now officially been created. At this point, a "success" HTTP response to the original API request is sent by the client. This confirms that the client knows the transaction was saved successfully and that it can move on to saving the next transaction in the TransactionQueue. In the background, the block model schedules additional work depending on the kind of change made for the transaction.

For example, the block model can schedule version history snapshots and indexing block text for a Quick Find function. The block model also notifies MessageStore, which is a real-time updates service, about the changes that were made.

The block model provides real-time updates to, for example, almost instantaneously show new blocks to members of a teamspace. Every client can have a long-lived WebSocket connection to the MessageStore. When the client renders a block (or page, or any other kind of record), the client subscribes to changes of that record from MessageStore using the WebSocket connection. When a team member opens the same page, the member is subscribed to changes of all those blocks. After changes have been made through the saveTransactions process, the API notifies MessageStore of new recorded versions. MessageStore finds client connections subscribed to those changing records and passes on the new version through their WebSocket connection. When a team member's client receives version update notifications from MessageStore, it verifies that version of the block in its local cache. Because the versions from the notification and the local block are different, the client sends a syncRecordValues API request to the server with the list of outdated client records. The server responds with the new record data. The client uses this response data to update the local cache with the new version of the records, then re-renders the UI to display the latest block data.

Blocks can be shared instantaneously with collaborators. In one example, a page is loaded using only local data. On the web, block data is pulled from being in memory. On native apps, loading blocks that are not in memory are loaded from the RecordCache persisted storage. However, if missing block data is needed, the data is requested from an API. The API method for loading the data for a page is referred to herein as loadPageChunk; it descends from a starting point (likely the block ID of a page block) down the content tree and returns the blocks in the content tree plus any dependent records needed to properly render those blocks. Several layers of caching for loadPageChunk are used, but in the worst case, this API might need to make multiple trips to the database as it recursively crawls down the tree to find blocks and their record dependencies. All data loaded by loadPageChunk is put into memory (and saved in the RecordCache if using the app). Once the data is in memory, the page is laid out and rendered using React.

Software Platform

FIG. 1 is a block diagram of an example platform 100. The platform 100 provides users with an all-in-one workspace for data and project management. The platform 100 can include a user application 102, an artificial intelligence (AI) tool 104, and a server 106. The user application 102, the AI tool 104, and the server 106 are in communication with each other via a network.

In some implementations, the user application 102 is a cross-platform software application configured to work on several computing platforms and web browsers. The user application 102 can include a variety of templates. A template refers to a prebuilt page that a user can add to a workspace within the user application 102. The templates can be directed to a variety of functions. Exemplary templates include a docs template 108, a wikis template 110, a projects template 112, a meeting and calendar template 114, and an email template 132. In some implementations, a user can generate, save, and share customized templates with other users.

The user application 102 templates can be based on content "blocks." For example, the templates of the user application 102 include a predefined and/or pre-organized set of blocks that can be customized by the user. Blocks are content containers within a template that can include text, images, objects, tables, maps, emails, and/or other pages (e.g., nested pages or subpages). Blocks can be assigned to certain properties. The blocks are defined by boundaries having dimensions. The boundaries can be visible or non-visible for users. For example, a block can be assigned as a text block (e.g., a block including text content), a heading block (e.g., a block including a heading), or a sub-heading block having a specific location and style to assist in organizing a page. A block can be assigned as a list block to include content in a list format. A block can be assigned as an AI prompt block (also referred to as a "prompt block") that enables a user to provide instructions (e.g., prompts) to the AI tool 104 to perform functions. A block can also be assigned to include audio, video, or image content.

A user can add, edit, and remove content from the blocks. The user can also organize the content within a page by moving the blocks around. In some implementations, the blocks are shared (e.g., by copying and pasting) between the different templates within a workspace. For example, a block embedded within multiple templates can be configured to show edits synchronously.

The docs template 108 is a document generation and organization tool that can be used for generating a variety of documents. For example, the docs template 108 can be used to generate pages that are easy to organize, navigate, and format. The wikis template 110 is a knowledge management application having features similar to the pages generated by the docs template 108 but that can additionally be used as a database. The wikis template 110 can include, for example, tags configured to categorize pages by topic and/or include an indication of whether the provided information is verified to indicate its accuracy and reliability. The projects template 112 is a project management and note-taking software tool. The projects template 112 can allow the users, either as individuals or as teams, to plan, manage, and execute projects in a single forum. The meeting and calendar template 114 is a tool for managing tasks and timelines. In addition to traditional calendar features, the meeting and calendar template 114 can include blocks for categorizing and prioritizing scheduled tasks, generating to-do and action item lists, tracking productivity, etc. The various templates of the user application 102 can be included under a single workspace and include synchronized blocks. For example, a user can update a project deadline on the projects template 112, which can be automatically synchronized to the meeting and calendar template 114. The various templates of the user application 102 can be shared within a team, allowing multiple users to modify and update the workspace concurrently.

The email template 132 allows the users to customize their inbox by representing the inbox as a customizable database where the user can add custom columns and create custom views with layouts. One view can include multiple layouts including a calendar layout, a summary layout, and an urgent information layout. Each view can include a customized structure including custom criteria, custom properties, and custom actions. The custom properties can be specific to a view such as AI-extracted properties and/or heuristic-based properties. The custom actions can trigger automatically when a message enters the view. The custom actions can include deterministic rules like "Archive this," or assistant workflows like responding to support messages by searching user applications 102 or filing support tickets. In addition, the view can include actions, such as buttons, that are custom to the view and perform operations on the messages in the inbox. Only the customized structure can be shared with other users of the system, or both the customized structure and the messages can be shared.

The integration of the docs template 108, the wikis template 110, the projects template 112, the meeting and calendar template 114, and the email template 132 enables linking and embedding of templates within other templates. For example, an email sent from an email address within the platform 100 to another email address within the platform 100 can include an embedding of a document within the platform 100, or an embedding of a block within the document. In another example, a wiki can link to a meeting within the calendar.

The AI tool 104 is an integrated AI assistant that enables AI-based functions for the user application 102. In one example, the AI tool 104 is based on a neural network architecture, such as the transformer 212 described in relation to FIG. 2. The AI tool 104 can interact with blocks embedded within the templates on a workspace of the user application 102. For example, the AI tool 104 can include a writing assistant tool 116, a knowledge management tool 118, a project management tool 120, and a meeting and scheduling tool 122. The different tools of the AI tool 104 can be interconnected and interact with different blocks and templates of the user application 102.

The writing assistant tool 116 can operate as a generative AI tool for creating content for the blocks in accordance with instructions received from a user. Creating the content can include, for example, summarizing, generating new text, or brainstorming ideas. For example, in response to a prompt received as a user input that instructs the AI to describe what the climate is like in New York, the writing assistant tool 116 can generate a block including text that describes the climate in New York. As another example, in response to a prompt that requests ideas on how to name a pet, the writing assistant tool 116 can generate a block including a list of creative pet names. The writing assistant tool 116 can also operate to modify existing text. For example, the writing assistant can shorten, lengthen, or translate existing text, correct grammar and typographical errors, or modify the style of the text (e.g., a social media style versus a formal style).

The knowledge management tool 118 can use AI to categorize, organize, and share knowledge included in the workspace. In some implementations, the knowledge management tool 118 can operate as a question-and-answer assistant. For example, a user can provide instructions on a prompt block to ask a question. In response to receiving the question, the knowledge management tool 118 can provide an answer to the question, for example, based on information included in the wikis template 110. The project management tool 120 can provide AI support for the projects template 112. The AI support can include autofilling information based on changes within the workspace or automatically tracking project development. For example, the project management tool 120 can use AI for task automation, data analysis, real-time monitoring of project development, allocation of resources, and/or risk mitigation. The meeting and scheduling tool 122 can use AI to organize meeting notes, unify meeting records, list key information from meeting minutes, and/or connect meeting notes with deliverable deadlines.

The server 106 can include various units (e.g., including compute and storage units) that enable the operations of the AI tool 104 and workspaces of the user application 102. The server 106 can include an integrations unit 124, an application programming interface (API) 128, databases 126, and an administration (admin) unit 130. The databases 126 are configured to store data associated with the blocks. The data associated with the blocks can include information about the content included in the blocks, the function associated with the blocks, and/or any other information related to the blocks. The API 128 can be configured to communicate the block data between the user application 102, the AI tool 104, and the databases 126. The API 128 can also be configured to communicate with remote server systems, such as AI systems. For example, when a user performs a transaction within a block of a template of the user application 102 (e.g., in a docs template 108), the API 128 processes the transaction and saves the changes associated with the transaction to the database 126. The integrations unit 124 is a tool connecting the platform 100 with external systems and software platforms. Such external systems and platforms can include other databases (e.g., cloud storage spaces), messaging software applications, or audio or video conference applications. The administration unit 130 is configured to manage and maintain the operations and tasks of the server 106. For example, the administration unit 130 can manage user accounts, data storage, security, performance monitoring, etc.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others. Unlike discriminative models, generative models are distinguished by their ability to create new, synthetic data that closely resembles the training data. In contrast, discriminative models focus on predicting labels for given inputs.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from online webpages and/or publicly available social media posts. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data can be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses large language models (LLMs).

A language model can use a neural network (typically a DNN) to perform natural language processing (NLP) tasks. A language model can be trained to model how words relate to each other in a textual sequence, based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as RNN-based language models.

Figure 2:
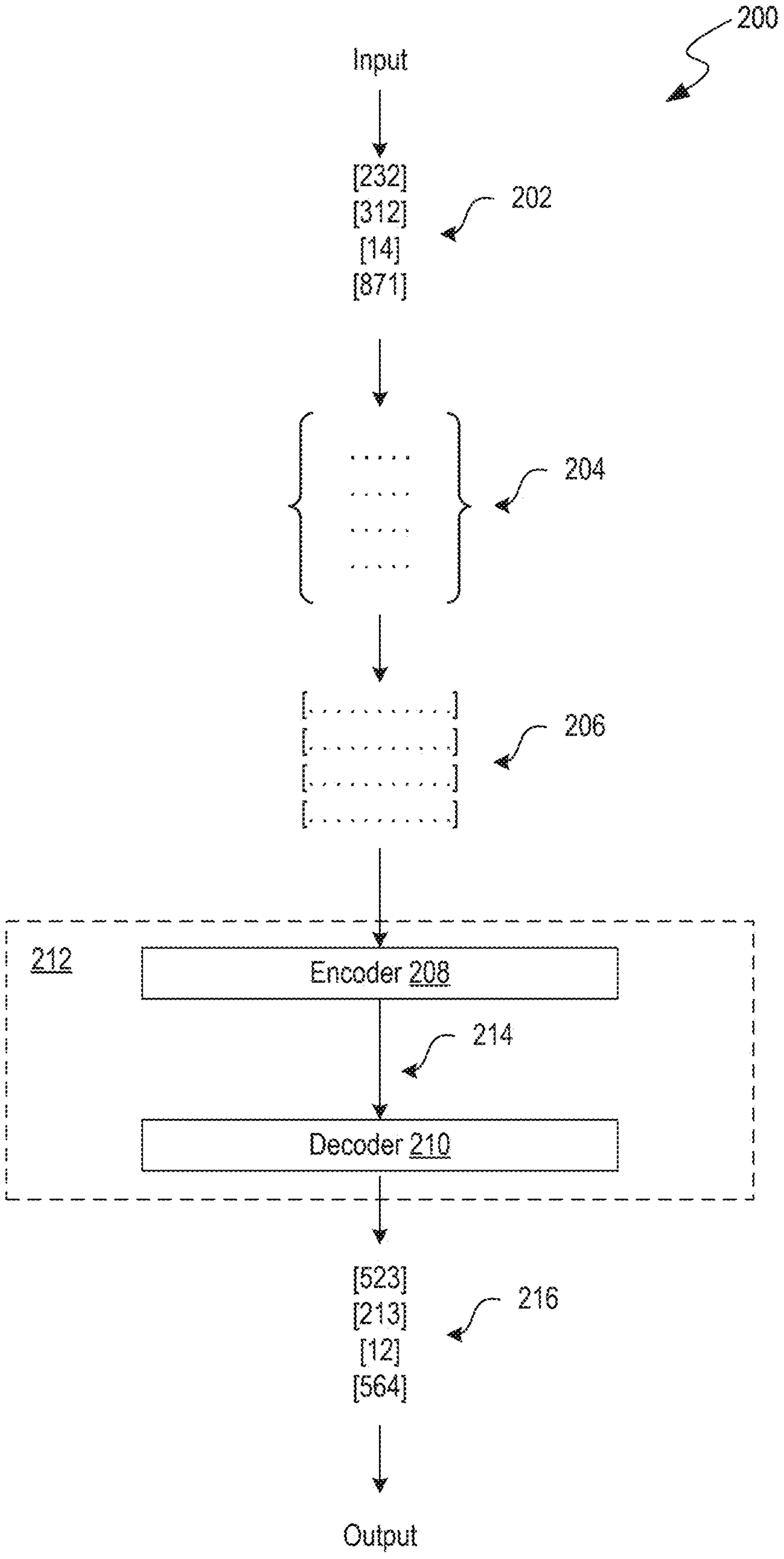
FIG. 2 is a block diagram of a transformer neural network, which may be used in examples of the present disclosure.

FIG. 2 is a block diagram 200 of an example transformer 212. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as RNN-based language models.

The transformer 212 includes an encoder 208 (which can include one or more encoder layers/blocks connected in series) and a decoder 210 (which can include one or more decoder layers/blocks connected in series). Generally, the encoder 208 and the decoder 210 each include multiple neural network layers, at least one of which can be a self-attention layer. The parameters of the neural network layers can be referred to as the parameters of the language model.

The transformer 212 can be trained to perform certain functions on a natural language input. Examples of the functions include summarizing existing content, brainstorming ideas, writing a rough draft, fixing spelling and grammar, and translating content. Summarizing can include extracting key points or themes from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 212 is trained to perform certain functions on other input formats than natural language input. For example, the input can include objects, images, audio content, or video content, or a combination thereof.

The transformer 212 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 2 illustrates an example of how the transformer 212 can process textual input data. Input to a language model (whether transformer-based or otherwise) typically is in the form of natural language that can be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 2, a short sequence of tokens 202 corresponding to the input text is illustrated as input to the transformer 212. Tokenization of the text sequence into the tokens 202 can be performed by some pre-processing tokenization module such as, for example, a byte-pair encoding tokenizer (the "pre" referring to the tokenization occurring prior to the processing of the tokenized input by the LLM), which is not shown in FIG. 2 for brevity. In general, the token sequence that is inputted to the transformer 212 can be of any length up to a maximum length defined based on the dimensions of the transformer 212. Each token 202 in the token sequence is converted into an embedding vector 206 (also referred to as "embedding 206").

An embedding 206 is a learned numerical representation (such as, for example, a vector) of a token that captures some semantic meaning of the text segment represented by the token 202. The embedding 206 represents the text segment corresponding to the token 202 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 206 corresponding to the "write" token will be closer to another embedding corresponding to the "jot down" token in the vector space as compared to the distance between the embedding 206 corresponding to the "write" token and another embedding corresponding to the "summary" token.

The vector space can be defined by the dimensions and values of the embedding vectors. Various techniques can be used to convert a token 202 to an embedding 206. For example, another trained ML model can be used to convert the token 202 into an embedding 206. In particular, another trained ML model can be used to convert the token 202 into an embedding 206 in a way that encodes additional information into the embedding 206 (e.g., a trained ML model can encode positional information about the position of the token 202 in the text sequence into the embedding 206). In some implementations, the numerical value of the token 202 can be used to look up the corresponding embedding in an embedding matrix 204, which can be learned during training of the transformer 212.

The generated embeddings 206 are input into the encoder 208. The encoder 208 serves to encode the embeddings 206 into feature vectors 214 that represent the latent features of the embeddings 206. The encoder 208 can encode positional information (i.e., information about the sequence of the input) in the feature vectors 214. The feature vectors 214 can have very high dimensionality (e.g., on the order of thousands or tens of thousands), with each element in a feature vector 214 corresponding to a respective feature. The numerical weight of each element in a feature vector 214 represents the importance of the corresponding feature. The space of all possible feature vectors 214 that can be generated by the encoder 208 can be referred to as a latent space or feature space.

Conceptually, the decoder 210 is designed to map the features represented by the feature vectors 214 into meaningful output, which can depend on the task that was assigned to the transformer 212. For example, if the transformer 212 is used for a translation task, the decoder 210 can map the feature vectors 214 into text output in a target language different from the language of the original tokens 202. Generally, in a generative language model, the decoder 210 serves to decode the feature vectors 214 into a sequence of tokens. The decoder 210 can generate output tokens 216 one by one. Each output token 216 can be fed back as input to the decoder 210 in order to generate the next output token 216. By feeding back the generated output and applying self-attention, the decoder 210 can generate a sequence of output tokens 216 that has sequential meaning (e.g., the resulting output text sequence is understandable as a sentence and obeys grammatical rules). The decoder 210 can generate output tokens 216 until a special [EOT] token (indicating the end of the text) is generated. The resulting sequence of output tokens 216 can then be converted to a text sequence in post-processing. For example, each output token 216 can be an integer number that corresponds to a vocabulary index. By looking up the text segment using the vocabulary index, the text segment corresponding to each output token 216 can be retrieved, the text segments can be concatenated together, and the final output text sequence can be obtained.

In some implementations, the input provided to the transformer 212 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to the question, text associated with the request, or a list of ideas associated with the request. For example, the input can include the question "What is the weather like in San Francisco?" and the output can include a description of the weather in San Francisco. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via an API (e.g., the API 128 in FIG. 1). As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Hierarchical Organizational Blocks in a Workspace

Figure 3:
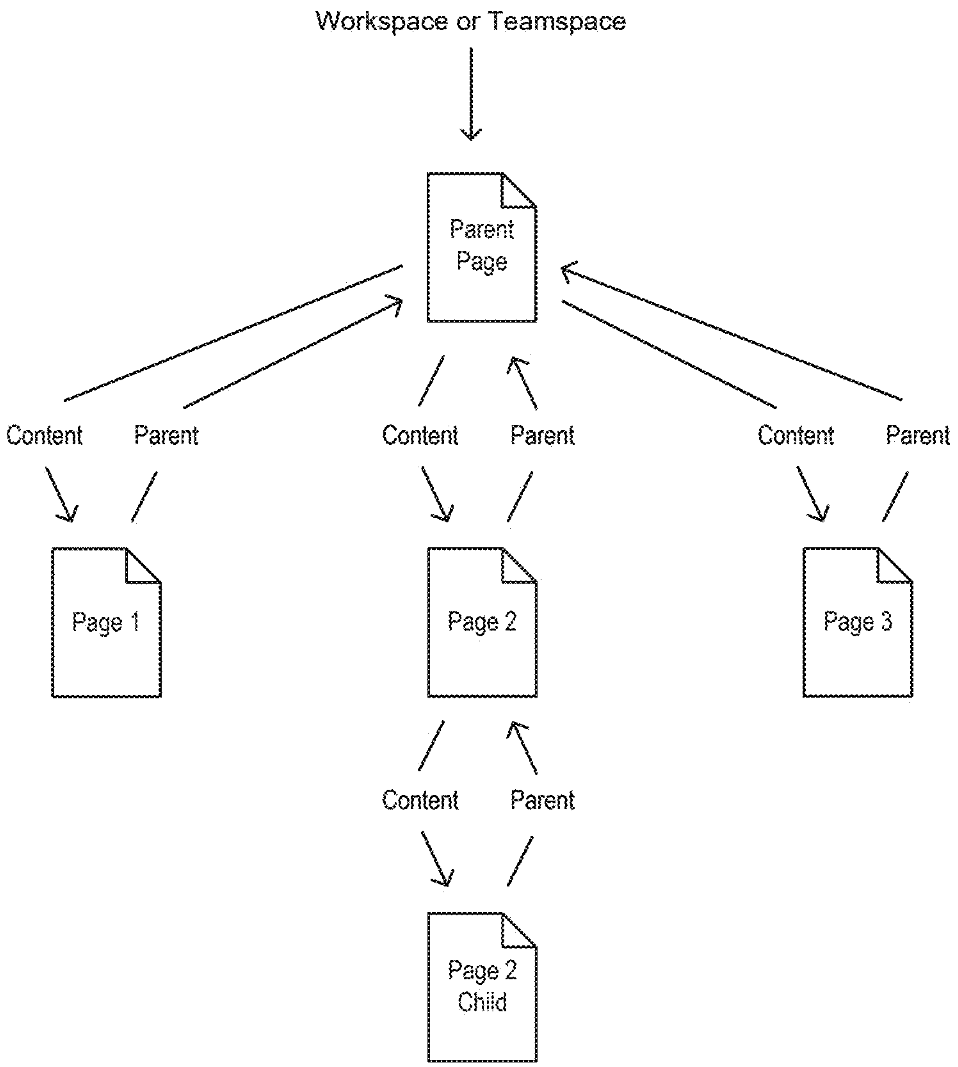
FIG. 3 is a block diagram illustrating a hierarchical organization of pages in a workspace.

FIG. 3 is a block diagram illustrating a hierarchical organization of pages in a workspace. As described with respect to the block data model of the present technology, a workspace can include multiple pages (e.g., page blocks). The pages (e.g., including parent pages and child or nested pages) can be arranged hierarchically within the workspace or one or more teamspaces, as shown in FIG. 3. The page can include a block such as tabs, lists, images, tables, etc.

A teamspace can refer to a collaborative space associated with a team or an organization that is hierarchically below a workspace. For example, a workspace can include a teamspace accessible by all users of an organization and multiple teamspaces that are accessible by users of different teams. Accessibility generally refers to creating, editing, and/or viewing content (e.g., pages) included in the workspace or the one or more teamspaces.

In the hierarchical organization illustrated in FIG. 3, a parent page (e.g., "Parent Page") is located hierarchically below the workspace or a teamspace. The parent page includes three children pages (e.g., "Page 1," "Page 2," and "Page 3"). Each of the child pages can further include subpages (e.g., "Page 2 Child," which is a grandchild of "Parent Page" and child of "Page 2"). The "Content" arrows in FIG. 3 indicate the relationship between the parents and children while the "Parent" arrows indicate the inheritance of access permissions. The child pages inherit access permission from the (immediate) parent page under which they are located hierarchically (e.g., which is above them in the tree). For example, "Page 2" inherited the access permission of the "Parent Page" as a default when it was created under its parent page. Similarly, "Page 2 Child" inherited the access permission of the parent page as a default when it was created under its parent page. "Parent Page," "Page 2," and "Page 2 Child" thereby have the same access permission within the workspace.

The relationships and organization of the content can be modified by changing the location of the pages. For example, when a child page is moved to be under a different parent, the child page's access permission modifies to correspond to the access permission of the new parent. Also, when the access permission of "Parent Page" is modified, the access permission of "Page 1," "Page 2," and "Page 3" can be automatically modified to correspond to the access permission of "Parent Page" based on the inheritance character of access permissions.

In contrast, however, a user can modify the access permission of the children independently of their parents. For example, the user can modify the access permission of "Page 2 Child" in FIG. 3 so that it is different from the access permission of "Page 2" and "Parent Page." The access permission of "Page 2 Child" can be modified to be broader or narrower than the access permission of its parents. As an example, "Page 2 Child" can be shared on the internet while "Page 2" is only shared internally to the users associated with the workspace. As another example, "Page 2 Child" can be shared only with an individual user while "Page 2" is shared with a group of users (e.g., a team of the organization associated with the workspace). In some implementations, the hierarchical inheritance of the access permissions described herein can be modified from the previous description. For example, the access permissions of all the pages (parent and children) can be defined as independently changeable.

Example Database Querying Environments

Figure 4:
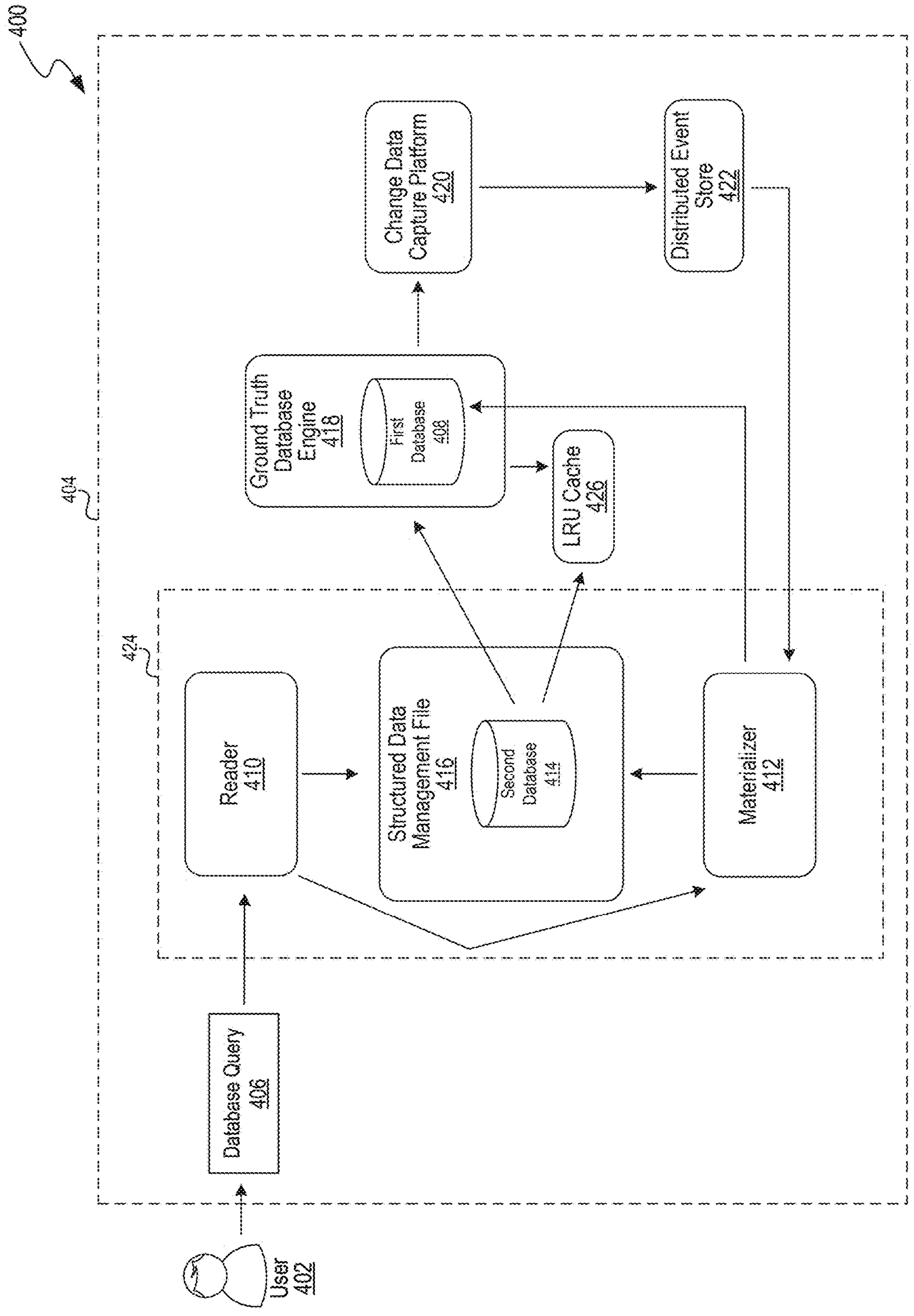
FIG. 4 illustrates an example database querying environment for efficiently retrieving data from a database.

FIG. 4 illustrates an example database querying environment 400 for efficiently retrieving data from a database. The database querying environment 400 includes a user 402, a workspace application 404, a database query 406, a first database 408, a reader 410, a materializer 412, a second database 414, a structured data management file 416, a ground truth database engine 418, a change data capture platform 420, a distributed event store 422, a first computer system 424, and a least recently used (LRU) cache. The database querying environment 400 may be implemented using the computer system illustrated and described in more detail with reference to FIG. 7. Likewise, implementations of the database querying environment 400 can include different and/or additional components or can be connected in different ways.

The user 402 is an individual or entity with access to a workspace. As depicted in FIG. 4, the workspace is provided to the user 402 via a workspace application 404 providing a suite of tools for data and/or project management (e.g., Notion®). The workspace is configurable by the user 402 to contain one or more databases in which the user 402 stores data. For example, the workspace may include a first database 408 which is dynamic, meaning that the properties of the database are freely updatable by the user 402, and user-defined, meaning that the properties of the database may be created and assigned to the database by the user (e.g., rather than being predefined by a developer of the workspace). Although the configuration of such a database is flexible, querying the first database may be slow and computationally inefficient, as the ability the user 402 has to modify the first database makes indexing entries in the first database in advance of receiving a query to enable quicker searching difficult or impossible.

The database querying environment 400 is configured to enable efficient querying of databases, such as the first database, despite the complications with respect to advanced indexing. For example, the user 402 may input a database query 406 to the database querying environment 400 (e.g., via a UI of the workspace application 404). The database query 406 is a request to perform a set of operations to retrieve data from the first database 408. As depicted in FIG. 4, the first database 408 is stored in a ground truth database engine 418. The ground truth database engine 418 is a relational database management system (RDBMS) (e.g., Postgres) which stores the most up-to-date versions of databases and/or blocks of the workspace application 404.

As depicted in FIG. 4, the workspace application 404 routes the database query 406 to a reader 410, which processes the database query 406 such that a response is generated. In some embodiments, the workspace application 404 includes a plurality of readers and the database query 406 is routed to the reader 410 based on a predetermined setting within the workspace application 404 (e.g., queries from users with certain user IDs are always directed to the reader 410). In other embodiments, database queries are randomly routed to readers including the reader 410.

The reader 410 is communicatively coupled to a materializer 412, which is a software component for generating structured, efficiently searchable databases, such as the second database 414. The second database 414 may be a database including a plurality of columns, with each column being associated with a property of the first database 408. Thus, the second database 414 may be a table containing some or all of the data within the first database 408, with the data being organized into columns according to each property of the first database 408. Additionally or alternatively, the second database 414 may be more efficient to query (e.g., requires less computational resources to query, faster to query) than the first database 408. For example, the second database 414 may be more efficient to query because each column in the second database 414 is indexed using a method corresponding to the property associated with the column. Continuing with the same example, date properties with both a start and end time may be indexed using a B-tree to allow for efficient filtering while text properties (e.g., titles, names of a user 402 or other entity, and/or other text), status properties (e.g., "to-do," "complete"), select properties (e.g., choices of one or more tags from a list of tags), and/or relational properties (e.g., positions in a hierarchical organization as described in relation to FIG. 3) may be indexed using full text search (FTS) such that keywords and/or specific strings are efficiently recognized when filtering. In some embodiments, text properties use a trigram tokenizer for their FTS index to support more granular string operations such as starts_with and/or ends_with.

In some embodiments, as an initial step in processing a database query 406, the reader 410 queries the materializer 412 as to whether a second database 414 based on the first database 408 has been generated. The materializer 412 may then determine whether the second database 414 has been generated by searching for a structured data management file 416 associated with the workspace. The structured data management file 416 is a file containing one or more structured databases, which are relational databases including data organized according to an explicit data model/structure. For example, the structured data management file 416 may be a SQLite file or a file associated with a similar relational database engine. The structured data management file 416 may be associated with the workspace by being associated with an identifier (e.g., a symbolic ID) assigned to the workspace within the workspace application 404. Additionally or alternatively, the materializer 412 may determine whether the second database 414 has been generated by searching for an identifier associated with the first database 408 within the structured data management file 416. For example, when a second database 414 based on the first database 408 has been generated and included in the structured data management file 416, the second database 414 can include an identifier assigned to the first database 408 within the workspace application 404, thereby indicating the relationship between the two databases. When the structured data management file 416 associated with the workspace and/or the identifier associated with the first database 408 within the structured data management file 416 are absent, the materializer 412 may determine that a second database 414 based on the first database 408 has not been generated and signal to the reader 410 to refrain from further processing the database query 406 until the second database 414 has been generated, thus delaying the processing until the processing may be performed more efficiently.

In embodiments where the second database 414 has not yet been generated, the materializer 412 generates the second database 414 based on the first database 408 within the structured data management file 416, which is associated with the workspace (e.g., via an identifier assigned to the workspace). For example, the materializer 412 may retrieve the latest set of properties (e.g., the schema) of the first database 408 from the ground truth database engine 418, either directly or via a cache. Continuing with the same example, the materializer 412 may then generate a column associated with each property and compile these columns into a table making up the second database 414. In some embodiments, the columns are indexed by an indexed representation of the second database 414, which includes an index associated with each column of the second database 414 that is generated based on the property associated with that column. For example, the indexed representation may include a B-tree index and/or an FTS index, as described above, and/or may include other indices appropriate for indexing other types of properties.

In some embodiments, one or more additional databases are generated within the structured data management file 416 to supplement the second database 414 and improve the efficiency of querying the second database 414. For example, a block value table may be generated including a serialized block value for each database included in the workspace. The serialized block value may be stored in a JSON file or other similar file format. Storing the serialized block values for each database separately from the second database 414 is computationally efficient because serialized block values are stored in large files and only need to be accessed while querying the second database 414 on occasion. Thus, performing operations on the second database 414 is made more computationally efficient by storing serialized block values in a block value table and fetching those values from the block value table only when the values are needed. As another example, a database metadata table including metadata associated with each database included in the workspace may be generated. The metadata in the database metadata table may include information such as the size of a database, the last used time of the database, and the like. As a third example, a notification metadata table including metadata used for receiving notifications of modifications to databases may be generated. This data may include metadata for resuming processing of events from a distributed event store 422 (described in more detail below) after the materializer 412 is re-deployed. Like the block value table, the database metadata table and notification metadata table improve computational efficiency by storing data that will sometimes be needed to query and/or update the second database 414 outside of the second database 414 itself, allowing the data to be accessed when needed without slowing down operations on the second database 414 where the data is not needed.

Because the first database 408 is dynamic and user-defined, modifications to the first database 408 can be made by the user 402 at any time. A modification to the first database 408 includes an addition of a property, application of a sorting operation, and/or application of a filtering operation. As depicted in FIG. 4, when a modification is received from the user, a change data capture platform 420 detects that a change has been made within the ground truth database engine 418 that reflects the modification. The change data capture platform 420 is a platform for automatically detecting changes to databases (e.g., Debezium). The change data capture platform 420 notifies the materializer 412 of a change in the ground truth database engine 418, signaling to the materializer 412 that the second database 414 should be updated to account for the modification. As depicted in FIG. 4, the notification is sent via a distributed event store 422, which is a software component for handling real-time data feeds (e.g., Apache Kafka) that is communicatively coupled to the change data capture platform 420. However, the present technology is not so limited. The materializer 412 may instead receive a notification of the modification directly from the change data capture platform 420. Additionally or alternatively, the materializer 412 may subscribe to a publisher/subscriber ("pub/sub") stream which emits records of changes in the ground truth database engine 418 (e.g., a Redis stream) and thereby detect a change in the ground truth database engine 418 via the pub/sub stream.

In some embodiments, the change data capture platform 420 in combination with the distributed event store 422 enable the materializer 412 to be taken out of deployment and then re-deployed without missing changes within the ground truth database engine 418 while the materializer 412 is not deployed. For example, on re-deploy, the materializer 412 may execute a validation and resume process which includes comparing databases in the structured data management file 416 to data stored in the distributed event store 422. This comparison is performed to identify whether modifications to the corresponding databases in the ground truth database engine 418 were made that have not yet been reflected by updating the databases in the structured data management file 416. Continuing with the same example, the modifications may not yet be reflected because the modifications occurred while the materializer 412 was not deployed and/or because the materializer 412 had only partially completed the process of updating a database before deployment of the materializer 412 was paused.

When a modification is detected, a new indexed representation of the second database 414 may be generated and the second database 414 may be updated based on the modification. In some embodiments, updating the second database 414 includes first determining that applying the modification to a current version of the second database 414 would not interfere with executing operations on the second database 414. For example, when the modification is a cosmetic change to how values of a property are rendered (e.g., rendering a number property as a currency or with a different number of decimal points), sorting and/or filtering operations within the second database 414 would not be impacted, and the modification is incorporated into the current version of the second database. However, in other embodiments, applying the modification would interfere with executing operations on the second database 414. For example, when a user adds a new property or modifies an existing property such that filtering and/or sorting the property is impacted (e.g., re-ordering the sort order for a status property), sorting the current version of the second database 414 would no longer perform as expected. Thus, an updated version of the second database may be generated that is generally the same as the current version (e.g., includes a second plurality of columns associated with properties of the first database 408) but which includes at least one column associated with the modification, and the current version of the second database 414 may be replaced with the updated version.

Once the second database 414 is generated and updated to account for any modifications to the first database, the materializer 412 notifies the reader 410 that the reader 410 may proceed with processing the database query 406. In some embodiments, the reader 410 proceeds with processing the database query 406 by transforming (e.g., compiling) the database query 406 into a second database query. The second database query is a request to perform a set of operations to retrieve data responsive to the database query but, unlike the database query 406, the set of operations in the second database query are divided into those executed on the first database 408 and executed on the second database 414. The process of transforming the database query 406 into a second database query is described in more detail in relation to FIG. 5 below. Once execution of the database query 406 is complete (which may include generating and executing a second database query), a response to the database query 406 is displayed to the user (e.g., via a UI of the workspace application 404). The response includes a set of data that the user 402 desired to retrieve by inputting the database query 406 and is based on an output of the execution of the database query 406.

In some embodiments, an open file connection with the structured data management file 416 is maintained for a predetermined duration of time (e.g., one hour) after processing of the database query 406 is complete. A third database query that, like the database query 406, is a query requesting data from the first database 408 is then received (e.g., from the user 402 or another user) and the workspace application 404 determines (e.g., using the reader 410) that the third database query is executable via the open file connection without generating stale results, which are query results that do not reflect the latest state of the database being queried. For example, stale results may occur when the third database query includes a read operation that does not finish processing until after a separate write operation and commit operation have been executed. The write and commit operations cause a change in the database being queried that will not be accounted for in the third database query because the read operation will be performed on a state of the database before the change. However, where a determination is made that stale results will not be generated, one or more operations included in the third database query are executed via the open file connection. Executing these operations via the already open file connection enables the operations to be executed more quickly, as the process of opening/closing a connection to a structured data management file 416 is slow and computationally intensive. By using the open file connection after determining that stale results will not be generated, a balance between the retrieval of accurate and up-to-date data with fast and efficient retrieval may be achieved.

Additionally or alternatively, efficiency of query processing may be improved by caching deserialized versions of blocks. Deserializing a block in the workspace application 404 is a computationally intensive process, but reading a deserialized version of a block is occasionally necessary when executing a query, as the query may include one or more operations that cannot be executed on a database within the structured data management file 416 and which are therefore executed on the more flexible but less efficient to read dynamic and user-defined databases included in the workspace application (e.g., within the ground truth database engine 418). Thus, in order to reduce the number of times the computationally intensive deserialization process is performed, after a block in the ground truth database engine 418 is deserialized, the deserialized block may be cached in an LRU cache 426, which stores the deserialized block until the deserialized block becomes the least recently used block out of a predetermined number of used deserialized blocks. One or more operations of the query may then be executed by accessing the deserialized block in the LRU cache 426, conserving computational resources as compared to re-deserializing the block each time the block is to be operated on.

In some embodiments, in order to conserve storage space in the structured data management file 416 and reduce the amount of computational resources spent on data storage, the second database 414 is deleted from the structured data management file 416 under conditions where the second database 414 is not likely to be reused. For example, these conditions may include the user 402 deleting the first database 408 upon which the second database 414 is based, indicating the user 402 does not intend to query for data within those databases in the future. As another example, the second database 414 may be stored in the LRU cache 426 (e.g., either instead of or in addition to deserialized blocks) and become designated as the least recently used database therein, indicating the second database 414 is unlikely to be reused.

In some embodiments, processes of the workspace application 404 are performed on a plurality of computer systems (e.g., a computer system 700 as described in relation to FIG. 7 below). However, as depicted in FIG. 4, at least the reader 410, materializer 412, and structured data management file 416 are stored on the same first computer system 424. Storing these elements on the same first computer system 424 allows databases stored in the structured data management file 416 to be reused for subsequent queries of the same workspace without expending additional computational resources on copying and/or retrieving the database. Additionally, the reader 410 and materializer 412 both have access to the structured data management file 416 and are communicatively coupled to one another within the first computer system, which reduces the maintenance and connectivity costs associated with maintaining multiple computer systems to host these components.

Figure 5:
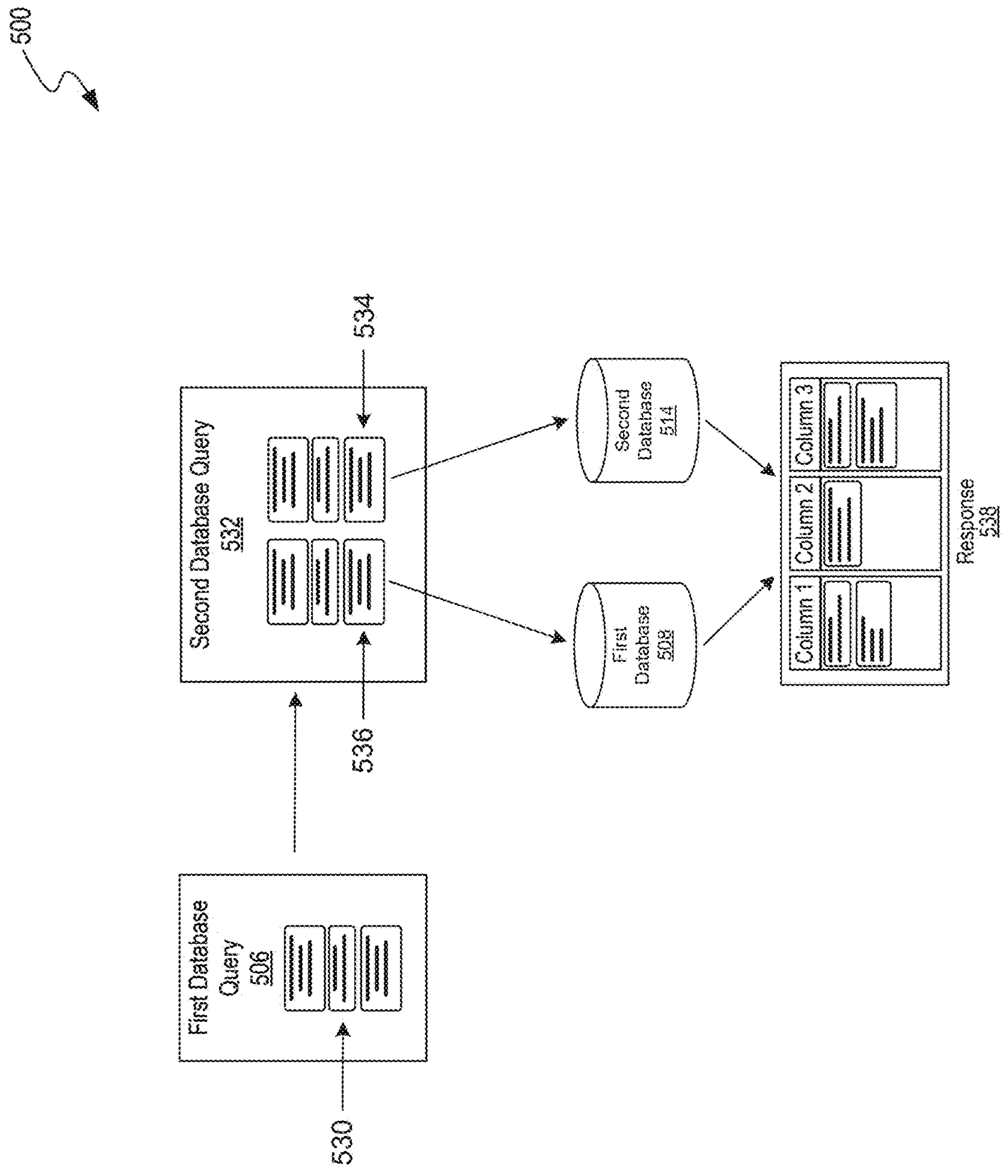
FIG. 5 is an illustration of an example database querying environment in which a response to a first database query is generated by transforming the first database query into a second database query.

FIG. 5 is an illustration of an example database querying environment 500 in which a response 538 to a first database query 506 is generated by transforming the first database query 506 into a second database query 532. The database querying environment 500 includes a first database query 506, a set of operations 530, a second database query 532, an initial subset of operations 534, a supplementary subset of operations 536, a first database 508, a second database 514, and a response 538. The database querying environment 500 may be implemented using the computer system illustrated and described in more detail with reference to FIG. 7. Likewise, implementations of the database querying environment 500 can include different and/or additional components or can be connected in different ways.

The first database query 506 may be the same as or generally similar to the database query 406 described in relation to FIG. 4 above and may be transformed into a second database query 532 by the reader 410 or another component of the workspace application 404, both as described in relation to FIG. 4 above. The first database query 506 includes a set of operations 530, which are operations to be performed to retrieve data from the first database 508. The first database 508 is a dynamic, user-defined database which may be the same as or generally similar to the first database 408 described in relation to FIG. 4 above.

As depicted in FIG. 5, the first database query 506 may be transformed by selecting an initial subset of operations 534 included in the first database query 506 to be executed on the second database 514. The second database 514 is a structured database and may be the same as or generally similar to the second database 414 described in relation to FIG. 4 above. The initial subset of operations 534 are operations which are executable on the second database 514, such as filtering and/or sorting operations based on one or more of the properties associated with the columns of the second database 514. As depicted in FIG. 5, a supplementary subset of operations 536 is also selected and included in the second database query 532. The supplementary subset of operations are operations that cannot be performed on the second database 514 but are instead executable on the first database 508. These operations may include filtering/sorting operations based on a formula, which is a property where a function is evaluated to return an output. Filtering and sorting operations based on a formula cannot be performed on the second database 514 because the values needed to evaluate the functions of the formula are not available within the second database 514. As another example, the supplementary subset of operations 536 may also include a sorting operation based on a person (e.g., a tag representing a user of the workspace application 404, as described in relation to FIG. 4 above), because the second database 514 only stores an identifier of the person rather than a name of the person, which would be the basis for the sorting operation. As a third example, the operations of the supplementary subset may include a sorting operation based on text, because the second database 514 does not store the local language in which the text should be sorted. In some embodiments, as many operations from the first database query 506 as are possible to execute on the second database 514 without error are included in the initial subset, as operations on the second database 514 are more efficient than operations on the first database 508 due to the indexed and structured nature of the second database 514.

In some embodiments, the initial subset of operations 534 is executed on the second database 514, resulting in an output of a subset of data from the second database 514 which corresponds to data in the first database 508. Thus, a subset of the first database 508 is selected upon which the supplementary subset of operations 536 may be executed and still result in a complete response to the first database query 506 (e.g., a response that is not missing data that is being searched for). Executing the supplementary subset of operations 536 on only a subset of the first database 508 enables efficient retrieval of data from the first database 508 without having to search the entirety of the first database 508, enabling the slowness of executing operations on the first database 508 in comparison to the second database 514 to be mitigated.

Example Database Query Response Method

Figure 6:
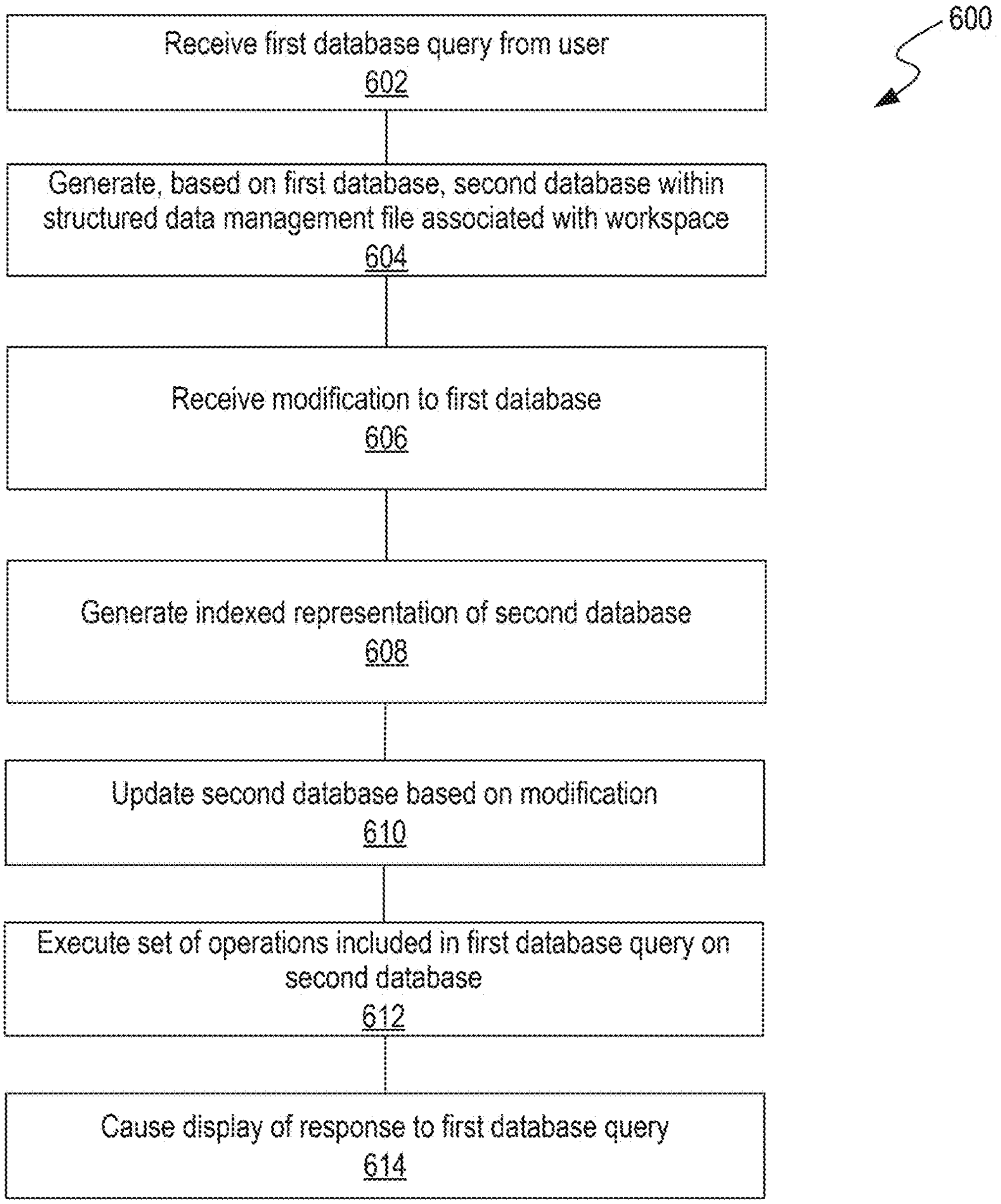
FIG. 6 is a flow diagram illustrating an example method of generating and displaying a response to a database query.

FIG. 6 is a flow diagram illustrating an example method 600 of generating and displaying a response to a database query. In some embodiments, the method 600 is performed by components of the example computer system illustrated and described in more detail in relation to FIG. 7 below and/or the workspace application 404 described in more detail in relation to FIG. 4 above. Likewise, embodiments can include different and/or additional operations or can perform the operations in different orders.

At operation 602, a first database query is received from a user. The database query may be the same as or generally similar to the database query 406 as described in relation to FIG. 4 above. The database query is a request to perform a set of operations to retrieve data from a first database. The first database may be the same as or generally similar to the first database 408 as described in relation to FIG. 4 above.

In some embodiments, after the first database query is received, a determination is made as to whether a second database based on the first database has been generated. The second database may be the same as or generally similar to the second database 414 as described in relation to FIG. 4 above. In some embodiments, the determination is made by identifying an absence of a structured data management file within a ground truth database engine, where the structured data management file is associated with a workspace accessible by the user. Additionally or alternatively, the determination may be made identifying an absence of an identifier associated with the first database within a structured data management file associated with the workspace. The structured data management file and ground truth database engine may be the same as or generally similar to the structured data management file 416 and ground truth database engine 418 as described in relation to FIG. 4 above, respectively.

At operation 604, a second database within a structured data management file associated with a workspace accessible by the user is generated based on the first database. The second database and the structured data management file may be the same as or generally similar to the second database 414 and structured data management file 416 as described in relation to FIG. 4 above, respectively. In some embodiments, querying the second database is more efficient than querying the first database (e.g., due to the indexed and structured nature of the second database). Additionally or alternatively, the second database may include a plurality of columns, with each column in the plurality of columns being associated with a property of the first database.

In some embodiments, the system generates additional tables within the structured data management file. These tables include a block value table with serialized block values for each database in the workspace, a database metadata table with metadata for each database, and a notification metadata table with metadata for receiving notifications of database modifications.

At operation 606, a modification to the first database is received. The modification may be at least one of an addition of a particular property, a sorting operation, or a filtering operation applied to the first database. In some embodiments, receiving a modification to the first database includes at least one of receiving a notification from a change data capture application of a change in the ground truth database or subscribing to a pub/sub stream and detecting a change in the ground truth database via the pub/sub stream.

At operation 608, an indexed representation of the second database is generated. The indexed representation includes the modification (e.g., represents the modification by adding, removing, or modifying an index associated with the second database). In operation 610, the second database is updated based on the modification. In some embodiments, updating the second database based on the modification includes determining that applying the modification to a current version of the second database would interfere with executing operations on the second database and generating an updated version of the second database. The updated version includes a second plurality of columns, with at least one column in the second plurality of columns being associated with the modification and at least one column in the second plurality of columns being included in the plurality of columns of the current version. The current version of the second database may then be replaced with the updated version.

At operation 612, a set of operations included in the first database query is executed on the second database. In some embodiments, executing the set of operations includes transforming the first database query into a second database query. This transformation may include selecting an initial subset of operations from the first database query to be executed on the second database, and a supplementary subset of operations to be executed, after the initial subset, on a subset of the first database. This subset of the first database is based on the output from executing the initial subset of operations. The second database query, the initial subset of operations, and the supplementary subset of operations may be the same as or generally similar to the second database query 532, the initial subset of operations 534, and the supplementary subset of operations 536 as described in relation to FIG. 5 above, respectively.

In such embodiments, the initial subset of operations is then executed on the second database and the supplementary subset of operations is then executed on the subset of the first database. Generating the indexed representation of the second database, transforming the first database query, executing the initial subset of operations, and executing the supplementary subset of operations may all be performed on a first data processor of the system. In some embodiments, the supplementary subset of operations includes at least one of a filtering operation based on a formula, a sorting operation based on a formula, a sorting operation based on a person, or a sorting operation based on text.

In operation 614, display of a response to the first database query is caused. The response may be based on an output of the execution of the set of operations at operation 612. In some embodiments, the response includes a set of data that the user desired to retrieve by inputting the database query and/or is displayed via a user interface of a workspace application.

In some embodiments, the method 600 further includes maintaining an open file connection with the structured data management file for a predetermined duration of time. A third database query of the first database may then be received. The third database query is a request to perform a set of operations to retrieve data from a third database, with the third database being a dynamic, user-defined database included in the workspace accessible by the user. A determination may then be made that the third database query is executable via the open file connection without generating stale results, as described in relation to FIG. 4 above. One or more operations included in the third database query may then be executed via the open file connection.

In these and other embodiments, the method 600 further includes deserializing a block stored in a ground truth database engine and caching the deserialized block in an LRU. The LRU cache and ground truth database engine may be the same as or generally similar to the LRU cache 426 and the ground truth database engine 418 as described in relation to FIG. 4 above, respectively. The deserialized block in the LRU cache may then be accessed while executing the supplementary subset of operations on the subset of the first database.

In some embodiments, the method 600 additionally includes deleting the second database from the structured data management file in response to determining that the first database has been deleted. Additionally or alternatively, the second database may be deleted from the structured data management file in response to determining that the second database is designated as a least recently used database in an LRU cache.

Computer System

Figure 7:
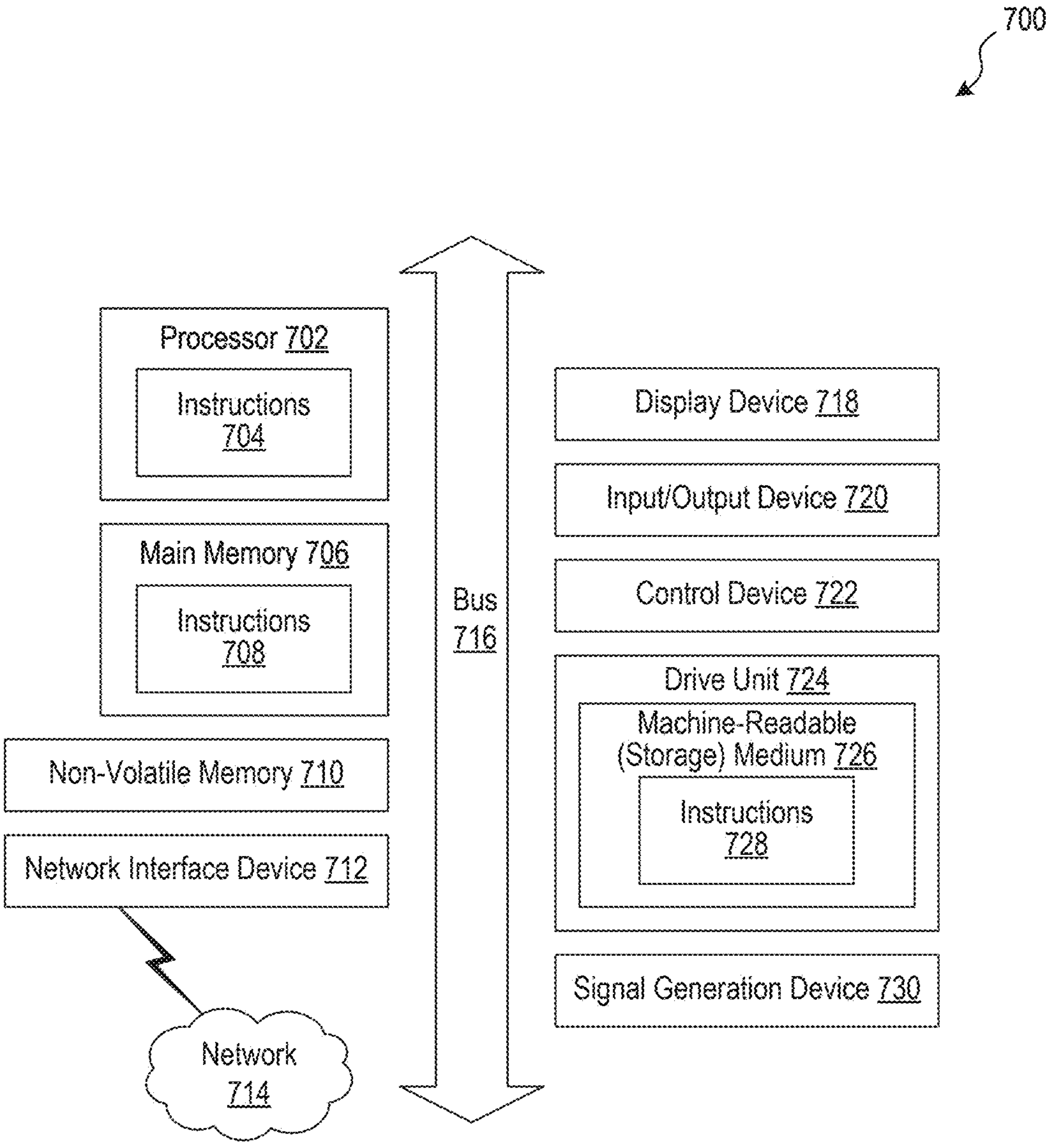
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a display device 718, an input/output device 720, a control device 722 (e.g., keyboard and pointing device), a drive unit 724 that includes a machine-readable (storage) medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computer system 700 can share a similar architecture as that of a server computer, personal computer (PC), tablet computer, mobile telephone, wearable electronic device, network-connected ("smart") device (e.g., a television or home assistant device), augmented reality/virtual reality (AR/VR) system (e.g., head-mounted display), or any electronic device capable of executing a set of instructions that specify action(s) to be taken by the computer system 700. In some implementations, the computer system 700 can be an embedded computer system, a system-on-chip (SOC), a single-board computer (SBC) system, or a distributed system such as a mesh of computer systems or include one or more cloud components in one or more networks. Where appropriate, one or more computer systems 700 can perform operations in real time, near real time, or in batch mode.

The network interface device 712 enables the computer system 700 to mediate data in a network 714 with an entity that is external to the computer system 700 through any communication protocol supported by the computer system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable medium 726 can include any medium that is capable of storing, encoding, or carrying a set of instructions for execution by the computer system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computer system 700 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," or any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. One or more non-transitory, computer-readable storage media comprising instructions recorded thereon, wherein the instructions, when executed by at least one data processor of a system, cause the system to:

receive a first database query from a user,
wherein the first database query is a request to perform a set of operations to retrieve data from a first database, and
wherein the first database is a dynamic, user-defined database included in a workspace accessible by the user;

determine that a second database based on the first database has not been generated,
wherein said determining includes at least one of identifying an absence of a structured data management file associated with the workspace or identifying an absence of an identifier associated with the first database within the structured data management file;

in response to said determining, generate, based on the first database, the second database within the structured data management file,
wherein querying the second database is more efficient than querying the first database,
wherein the second database includes a plurality of columns, and wherein each column in the plurality of columns is associated with a property of the first database;

receive a modification to the first database,
wherein the modification is at least one of an addition of a particular property to the first database, a sorting operation applied to the first database, or a filtering operation applied to the first database;

generate an indexed representation of the second database,
wherein the indexed representation includes the modification;

update the second database based on the modification;

transform the first database query into a second database query,
wherein said transforming includes selecting an initial subset of operations included in the first database query to be executed on the second database, and
wherein said transforming includes selecting a supplementary subset of operations included in the first database query to be executed, after the initial subset of operations is executed, on a subset of the first database, and
wherein the subset of the first database is based on an output from executing the initial subset of operations;

execute the initial subset of operations on the second database;

execute the supplementary subset of operations on the subset of the first database; and cause display of a response to the second database query,
wherein the response is based on the output from executing the initial subset of operations and an output from executing the supplementary subset of operations.

2. The one or more non-transitory, computer-readable storage media of claim 1, further comprising instructions to:

generate, within the structured data management file associated with the workspace, a block value table including a serialized block value for each database included in the workspace accessible by the user;

generate, within the structured data management file associated with the workspace, a database metadata table including metadata associated with each database included in the workspace accessible by the user; and generate, within the structured data management file associated with the workspace, a notification metadata table including metadata used for receiving notifications of modifications to databases.

3. The one or more non-transitory, computer-readable storage media of claim 1, wherein receiving the modification to the first database comprises at least one of:

receiving a notification from a change data capture platform of a first change in a ground truth database engine; or subscribing to a pub/sub stream and detecting a second change in the ground truth database engine via the pub/sub stream.

4. The one or more non-transitory, computer-readable storage media of claim 1, further comprising instructions to:

maintain, for a predetermined duration of time, an open file connection with the structured data management file associated with the workspace;

receive a third database query from a second user, wherein the third database query is a second request to perform a second set of operations to retrieve data from a third database, wherein the third database is an additional dynamic, user-defined database included in the workspace accessible by the user;

determine that the third database query is executable via the open file connection without generating stale results; and in response to said determining that the third database query is executable via the open file connection without generating stale results, execute an operation included in the third database query via the open file connection.

5. The one or more non-transitory, computer-readable storage media of claim 1, wherein updating the second database based on the modification comprises:

determining that applying the modification to a current version of the second database would interfere with executing operations on the second database;

generating an updated version of the second database, wherein the updated version includes a second plurality of columns, wherein at least one column in the second plurality of columns is associated with the modification, and wherein the at least one column in the second plurality of columns is included in the plurality of columns; and replacing the current version of the second database with the updated version.

6. The one or more non-transitory, computer-readable storage medium media of claim 1, wherein the supplementary subset of operations comprises at least one of:

a second filtering operation based on a first formula;

a second sorting operation based on a second formula;

a third sorting operation based on a person; or a fourth sorting operation based on text.

7. The one or more non-transitory, computer-readable storage media of claim 6, further comprising instructions to:

deserialize a block stored in a ground truth database engine;

cache the deserialized block in a least recently used (LRU) cache; and while executing the supplementary subset of operations on the subset of the first database, access the deserialized block in the LRU cache.

8. The one or more non-transitory, computer-readable storage media of claim 1, wherein:

generating the indexed representation of the second database, transforming the first database query, executing the initial subset of operations, and executing the supplementary subset of operations are all performed on a first computer system.

9. The one or more non-transitory, computer-readable storage media of claim 1, further comprising instructions to:

in response to at least one of a deletion of the first database by the user or a designation of the second database as a least recently used database in a least recently used (LRU) cache, delete the second database from the structured data management file.

10. A system comprising:

at least one hardware processor; and at least one non-transitory memory storing instructions, which, when executed by the at least one hardware processor, cause the system to:

receive a first database query from a user, wherein the first database query is a request to perform a set of operations to retrieve data from a first database, and wherein the first database is a dynamic, user-defined database included in a workspace accessible by the user;

generate, based on the first database, a second database within a structured data management file associated with the workspace, wherein querying the second database is more efficient than querying the first database, wherein the second database includes a plurality of columns, and wherein each column in the plurality of columns is associated with a property of the first database;

receive a modification to the first database, wherein the modification is at least one of an addition of a particular property to the first database, a sorting operation applied to the first database, or a filtering operation applied to the first database;

generate an indexed representation of the second database, wherein the indexed representation includes the modification;

update the second database based on the modification;

execute the set of operations on the second database; and cause display of a response to the first database query, wherein the response is based on an output of the execution of the set of operations.

11. The system of claim 10, wherein executing the set of operations on the second database comprises:

transforming the first database query into a second database query, wherein said transforming includes selecting an initial subset of operations included in the first database query to be executed on the second database, and wherein said transforming includes selecting a supplementary subset of operations included in the first database query to be executed, after the initial subset of operations is executed, on a subset of the first database, and wherein the subset of the first database is based on an output from executing the initial subset of operations;

executing the initial subset of operations on the second database; and executing the supplementary subset of operations on the subset of the first database.

12. The system of claim 11, further comprising instructions to:

deserialize a block stored in a ground truth database engine;

cache the deserialized block in a least recently used (LRU) cache; and while executing the supplementary subset of operations on the subset of the first database, access the deserialized block in the LRU cache.

13. The system of claim 10, further comprising instructions to:

before generating the second database, determine that a second database based on the first database has not been generated, wherein said determining includes at least one of identifying an absence of the structured data management file or identifying an absence of an identifier associated with the first database within the structured data management file associated.

14. The system of claim 10, further comprising instructions to:

generate, within the structured data management file associated with the workspace, a block value table including a serialized block value for each database included in the workspace accessible by the user;

generate, within the structured data management file associated with the workspace, a database metadata table including metadata associated with each database included in the workspace accessible by the user; and generate, within the structured data management file associated with the workspace, a notification metadata table including metadata used for receiving notifications of modifications to databases.

15. The system of claim 10, further comprising instructions to:

maintain, for a predetermined duration of time, an open file connection with the structured data management file associated with the workspace;

receive a third database query from a second user, wherein the third database query is a second request to perform a second set of operations to retrieve data from a third database, wherein the third database is an additional dynamic, user-defined database included in the workspace accessible by the user;

determine that the third database query is executable via the open file connection without generating stale results; and in response to said determining, execute an operation included in the third database query via the open file connection.

16. A method comprising:

receiving a first database query from a user, wherein the first database query is a request to perform a set of operations to retrieve data from a first database, and wherein the first database is a dynamic, user-defined database included in a workspace accessible by the user;

generating, based on the first database, a second database within a structured data management file associated with the workspace, wherein querying the second database is more efficient than querying the first database, wherein the second database includes a plurality of columns, and wherein each column in the plurality of columns is associated with a property of the first database;

receiving a modification to the first database, wherein the modification is at least one of an addition of a particular property to the first database, a sorting operation applied to the first database, or a filtering operation applied to the first database;

generating an indexed representation of the second database, wherein the indexed representation includes the modification;

updating the second database based on the modification;

executing the set of operations on the second database; and causing display of a response to the first database query, wherein the response is based on an output of the execution of the set of operations.

17. The method of claim 16, wherein executing the set of operations on the second database comprises:

transforming the first database query into a second database query, wherein said transforming includes selecting an initial subset of operations included in the first database query to be executed on the second database, and wherein said transforming includes selecting a supplementary subset of operations included in the first database query to be executed, after the initial subset of operations is executed, on a subset of the first database, and wherein the subset of the first database is based on an output from executing the initial subset of operations;

executing the initial subset of operations on the second database; and executing the supplementary subset of operations on the subset of the first database.

18. The method of claim 16, further comprising:

before generating the second database, determining that a second database based on the first database has not been generated, wherein said determining includes at least one of identifying an absence of the structured data management file within a ground truth database engine or identifying an absence of an identifier associated with the first database within the structured data management file.

19. The method of claim 17, further comprising:

maintaining, for a predetermined duration of time, an open file connection with the structured data management file associated with the workspace;

receiving a third database query from a second user, wherein the third database query is a second request to perform a second set of operations to retrieve data from a third database, wherein the third database is an additional dynamic, user-defined database included in the workspace accessible by the user;

determining that the third database query is executable via the open file connection without generating stale results; and in response to said determining, executing an operation included in the third database query via the open file connection.

* * * * *